(12) United States Patent
Jing et al.

(10) Patent No.: US 12,466,222 B2
(45) Date of Patent: Nov. 11, 2025

(54) TOWING DEVICE FOR VEHICLE AND VEHICLE

(71) Applicants: ZHEJIANG LIANKONG TECHNOLOGIES CO., LTD, Zhejiang (CN); ZHEJIANG GEELY HOLDING GROUP CO., LTD, Zhejiang (CN)

(72) Inventors: Xiaoxiang Jing, Hangzhou (CN); Kent Ove Bovellan, Hangzhou (CN); Tao Fu, Hangzhou (CN); Qiang Dai, Hangzhou (CN); Jian Liang, Hangzhou (CN); Ze Yu, Hangzhou (CN); Shuhao Wei, Hangzhou (CN); Qun Liu, Hangzhou (CN)

(73) Assignees: ZHEJIANG LIANKONG TECHNOLOGIES CO., LTD, Ningbo (CN); ZHEJIANG GEELEY HOLDING GROUP CO., LTD, Hangzhou (CN)

( * ) Notice: Subject to any disclaimer, the term of this patent is extended or adjusted under 35 U.S.C. 154(b) by 550 days.

(21) Appl. No.: 18/001,168

(22) PCT Filed: May 20, 2021

(86) PCT No.: PCT/CN2021/094888
§ 371 (c)(1),
(2) Date: Dec. 8, 2022

(87) PCT Pub. No.: WO2021/249148
PCT Pub. Date: Dec. 16, 2021

(65) Prior Publication Data
US 2023/0226865 A1    Jul. 20, 2023

(30) Foreign Application Priority Data
Jun. 8, 2020    (CN) .......................... 202010513485.X

(51) Int. Cl.
*B60D 1/56* (2006.01)
*B60D 1/04* (2006.01)
(Continued)

(52) U.S. Cl.
CPC ................. *B60D 1/56* (2013.01); *B60D 1/04* (2013.01); *B60D 1/488* (2013.01); *B60R 19/34* (2013.01)

(58) Field of Classification Search
CPC . B60D 1/56; B60D 1/04; B60D 1/488; B60D 1/06; B60D 1/485; B60D 1/52;
(Continued)

(56) References Cited

U.S. PATENT DOCUMENTS 2,569,086 A * 9/1951 Zenk .................. B60D 1/485
                                                          280/495
3,838,872 A   10/1974 Fullhart
(Continued)

FOREIGN PATENT DOCUMENTS

CN    201415652 Y    3/2010
CN    103029556 A    4/2013
(Continued)

OTHER PUBLICATIONS

Annex to the communication about intention to grant a European patent issued in counterpart European Patent Application No. EP 21823143.9, dated Apr. 29, 2024.
(Continued)

*Primary Examiner* — Valentin Neacsu
*Assistant Examiner* — Marlon A Arce
(74) *Attorney, Agent, or Firm* — Westbridge IP LLC

(57) ABSTRACT

Disclosed are a towing device for a vehicle and a vehicle. The towing device includes a front end portion and a rear end portion connected to the front end portion, where the front end portion is arranged on a rear floor and a rear floor
(Continued)

cross member, so as to disperse an external force borne by the front end portion to the rear floor cross member; and the rear end portion includes a connecting seat and a tow hook connected to the connecting seat and extending out towards an exterior of the vehicle, the connecting seat being arranged on a rear anti-collision beam, so as to transmit an external force borne by the rear end portion to longitudinal members by means of the rear anti-collision beam and energy absorption boxes.

7 Claims, 3 Drawing Sheets

(51) Int. Cl.
  *B60D 1/48* (2006.01)
  *B60R 19/34* (2006.01)
(58) Field of Classification Search
  CPC ...... B60D 1/243; B60R 19/34; B62D 25/209; B62D 21/18
  See application file for complete search history.

(56) References Cited

U.S. PATENT DOCUMENTS

| | | | |
|---|---|---|---|
| 5,094,469 | A | 3/1992 | Yamamoto et al. |
| 5,193,837 | A | 3/1993 | Fink et al. |
| 5,876,078 | A * | 3/1999 | Miskech ............... B60R 19/18 293/133 |
| 6,739,613 | B2 | 5/2004 | Aquinto et al. |
| 9,505,280 | B2 * | 11/2016 | Furukawa ............... B60D 1/485 |
| 9,914,332 | B2 * | 3/2018 | Jordan .................... B60D 1/52 |
| 2011/0278822 | A1 | 11/2011 | Lungershausen et al. |

FOREIGN PATENT DOCUMENTS

| | | |
|---|---|---|
| CN | 203902183 U | 10/2014 |
| CN | 107901714 A | 4/2018 |
| CN | 208198316 U | 12/2018 |
| CN | 109910804 A | 6/2019 |
| CN | 110001319 A | 7/2019 |
| CN | 111661161 A | 9/2020 |
| DE | 19805717 A1 | 8/1998 |
| DE | 10235184 A1 | 2/2004 |
| DE | 102007017422 A1 | 10/2008 |
| DE | 102011115686 A1 | 4/2013 |
| JP | S57-148156 | 9/1982 |
| JP | S59-051603 | 3/1984 |
| JP | S60-173700 | 9/1985 |
| JP | S62-080705 | 4/1987 |
| JP | 1987-130906 | 6/1987 |
| JP | S62130906 U | 8/1987 |
| JP | S63-019421 | 1/1988 |
| JP | 2005-231477 A | 9/2005 |

OTHER PUBLICATIONS

Decision to Grant a Patent issued in counterpart Japanese Patent Application No. JP 2022-574235, dated Apr. 2, 2024.
Office Action for Japanese Patent Application No. 2022-574235, dated Nov. 7, 2023 (10 pages with English translation).
International Search Report and Written Opinion for PCT/CN2021/094888 (ISA/CN) mailed Aug. 18, 2021 (18 pages).
1st Office Action for China Patent Application No. 202010513485X dated Mar. 29, 2021 (7 pages).
European Search Report for EP Patent Application No. 21823143.9 dated Sep. 14, 2023 (4 pages).
1st Office Action for EP Patent Application No. 21823143.9 dated Sep. 26, 2023 (6 pages).

* cited by examiner

TOWING DEVICE FOR VEHICLE AND VEHICLE

CROSS-REFERENCE TO RELATED APPLICATIONS

This application is a national phase entry of International Application No. PCT/CN2021/094888, filed May 20, 2021, which claims priority to Chinese Application No. 202010513485.X, filed Jun. 8, 2020, the entire contents of which are each incorporated herein by reference.

FIELD OF THE INVENTION

The present disclosure relates to the technical field of vehicle parts, and in particular to a towing device for a vehicle and a vehicle.

BACKGROUND OF THE INVENTION

Presently, a towing device for a vehicle generally has its own cross member. Before the towing device is mounted on the vehicle, it is necessary to remove the original rear anti-collision beam and energy absorption boxes of the vehicle, and then connect the cross member of the towing device to a longitudinal member of the vehicle by means of a fastener.

With the cross member, such a structure has heavy weight and large size. It generally takes a long time to mount such a structure by one person with auxiliary tools, which is difficult. Moreover, as a hard connection between the cross member of the towing device and the longitudinal member of the vehicle cannot play a role of crumpling and energy absorption, a collision force is directly transmitted to the vehicle body in case of collision. In addition, with the original rear anti-collision beam and the energy absorption boxes of the vehicle removed, the protection effect for low-speed collision is lost, and the safety performance of the vehicle for low-speed collision is reduced.

BRIEF DESCRIPTION OF THE INVENTION

One objective of the present disclosure is to solve the technical problem that a towing device in the prior art loses a protection effect for low-speed collision and is difficult to mount by one person due to heavy weight.

One further objective of the present disclosure is to improve torsion resistance of the towing device, to withstand torque of a vehicle body in a width direction when a vehicle turns and a road surface is bumpy and fluctuates.

Particularly, the present disclosure provides a towing device for a vehicle. The vehicle includes two longitudinal members longitudinally extending along the vehicle, a rear anti-collision beam arranged on one side of the two longitudinal members and transversely extending along the vehicle, and a rear floor and a rear floor cross member that are arranged between the two longitudinal members, where an end of each of the longitudinal members close to the rear anti-collision beam is connected to the rear anti-collision beam by means of an energy absorption box.

The towing device includes a front end portion and a rear end portion connected to the front end portion, where
the front end portion is arranged on the rear floor and the rear floor cross member, so as to disperse an external force borne by the front end portion to the rear floor cross member, and
the rear end portion includes a connecting seat and a tow hook connected to the connecting seat and extending out towards an exterior of the vehicle, the connecting seat being arranged on the rear anti-collision beam, so as to transmit an external force borne by the rear end portion to the longitudinal members by means of the rear anti-collision beam and the energy absorption boxes.

Optionally, the front end portion includes a U-shaped beam, the U-shaped beam being arranged on a back surface of the rear floor.

Optionally, the U-shaped beam is provided with a first end and a second end that are oppositely arranged, and the front end portion further includes two L-shaped supports, the two L-shaped supports being both arranged on a front surface of the rear floor;
one end of one L-shaped support being connected to the first end of the U-shaped beam, and the other end of the one L-shaped support being connected to the rear floor cross member; and
one end of the other L-shaped support being connected to the second end of the U-shaped beam, and the other end of the other L-shaped support being connected to the rear floor cross member.

Optionally, the first end of the U-shaped beam is provided with at least one first mounting hole, the second end of the U-shaped beam is provided with at least one second mounting hole, and one end of each of the L-shaped supports is provided with at least one third mounting hole; and
the towing device further includes at least one first bolt and at least one second bolt, the first bolt penetrating the first mounting hole of the first end and the third mounting hole of one L-shaped support, to connect the U-shaped beam and the one L-shaped support together, and
the second bolt penetrating the second mounting hole of the second end and the third mounting hole of the other L-shaped support, to connect the U-shaped beam and the other L-shaped support together.

Optionally, the other end of each of the L-shaped supports is provided with at least one fourth mounting hole, and the towing device further includes at least one third bolt and at least one fourth bolt,
the third bolt penetrating one L-shaped support and the rear floor cross member, to connect the one L-shaped support and the rear floor cross member together, and
the fourth bolt penetrating the other L-shaped support and the rear floor cross member, to connect the other L-shaped support and the rear floor cross member together.

Optionally, the rear floor cross member is internally provided with a cross member reinforcing plate, and the L-shaped supports penetrate the cross member reinforcing plate when being connected to the rear floor cross member.

Optionally, the connecting seat is arranged on a back surface of the rear anti-collision beam.

Optionally, the connecting seat is detachably connected to the U-shaped beam.

Particularly, the present disclosure further provides a vehicle. The vehicle includes the above towing device.

According to the solution of the embodiments of the present disclosure, a structure of the towing device is designed, the front end portion of the towing device is arranged on the rear floor and the rear floor cross member of the vehicle, and the connecting seat of the rear end portion is arranged on the rear anti-collision beam, such that the original rear anti-collision beam and energy absorption boxes of the vehicle are reserved, and during low-speed collision, the rear anti-collision beam and the energy absorption boxes may still absorb collision energy by way of deformation. In addition, since the towing device is only provided with the front end portion and the rear end portion, compared with the solution that a towing device is provided with a cross member in the prior art, an overall weight thereof is greatly reduced, such that mounting operation by one person may be achieved.

In addition, the U-shaped beam and one end of each of the L-shaped supports are connected to the rear floor, the other end of each of the L-shaped supports together with the cross member reinforcing plate is connected to the rear floor cross member, and during towing, stress of the tow hook uniformly disperses a tensile force to the rear floor cross member by means of the U-shaped beam, to achieve the purpose of bearing the tensile force of a vehicle body in a length direction.

Moreover, the U-shaped beam is arranged to be U-shaped, such that connecting points on the rear floor cross member are separated by a certain distance in a width direction of the vehicle body, torsion resistance of the towing device is enhanced, and capacity of bearing torque in the width direction of the vehicle body may be achieved when the vehicle turns and a road surface is bumpy and fluctuates. The L-shaped supports have the effects of a reinforcing rib and a flanging and bear bending moment generated due to road bumping during towing together with the cross member reinforcing plate.

At a rear end of the towing device, the connecting seat is connected to the rear anti-collision beam, and a tensile force and a vertical force borne by the rear end are transmitted to the longitudinal members by means of the rear anti-collision beam and the energy absorption boxes, to satisfy a vertical carrying requirement. The first mounting hole, the second mounting hole, the third mounting hole and the fourth mounting hole are provided in the mode of the embodiments of the present disclosure, such that the functions of the U-shaped beam and the L-shaped supports may be further enhanced.

With reference to the detailed description of the specific embodiments of the present disclosure in combination with the accompanying drawings below, the above and other objectives, advantages and features of the present disclosure will become more apparent to those skilled in the art.

BRIEF DESCRIPTION OF THE DRAWINGS

Some specific embodiments of the present disclosure will be described in details in an illustrative way rather than a limiting way below with reference to the accompanying drawings. The same reference numerals in the accompanying drawings indicate the same or similar components or portions. Those skilled in the art should understand that these accompanying drawings are not necessarily drawn to scale. In the figures.

In the figures: 1—longitudinal member, 2—energy absorption box, 3—rear anti-collision beam, 4—rear floor, 5—rear floor cross member, 6—front end portion, 61—U-shaped beam, 611—first end, 612—second end, 613—first mounting hole, 614—second mounting hole, 615—third mounting hole, 616—fourth mounting hole, 62—L-shaped support, 7—rear end portion, 71—connecting seat, 711—connecting plate, 712—fixing frame, 72—tow hook, 8—first bolt, 9—second bolt, 10—third bolt and 11—fourth bolt.

DETAILED DESCRIPTION

Figure 1:
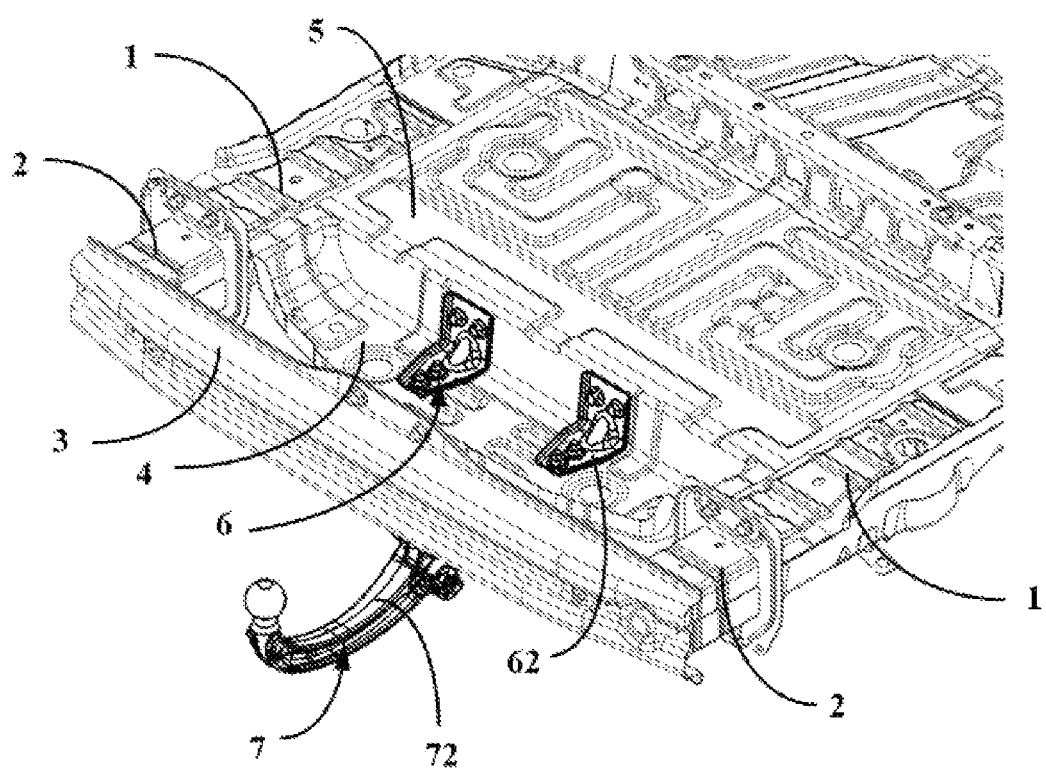
FIG. 1 shows a front schematic structural diagram of a towing device for a vehicle according to an embodiment of the present disclosure.
Figure 2:
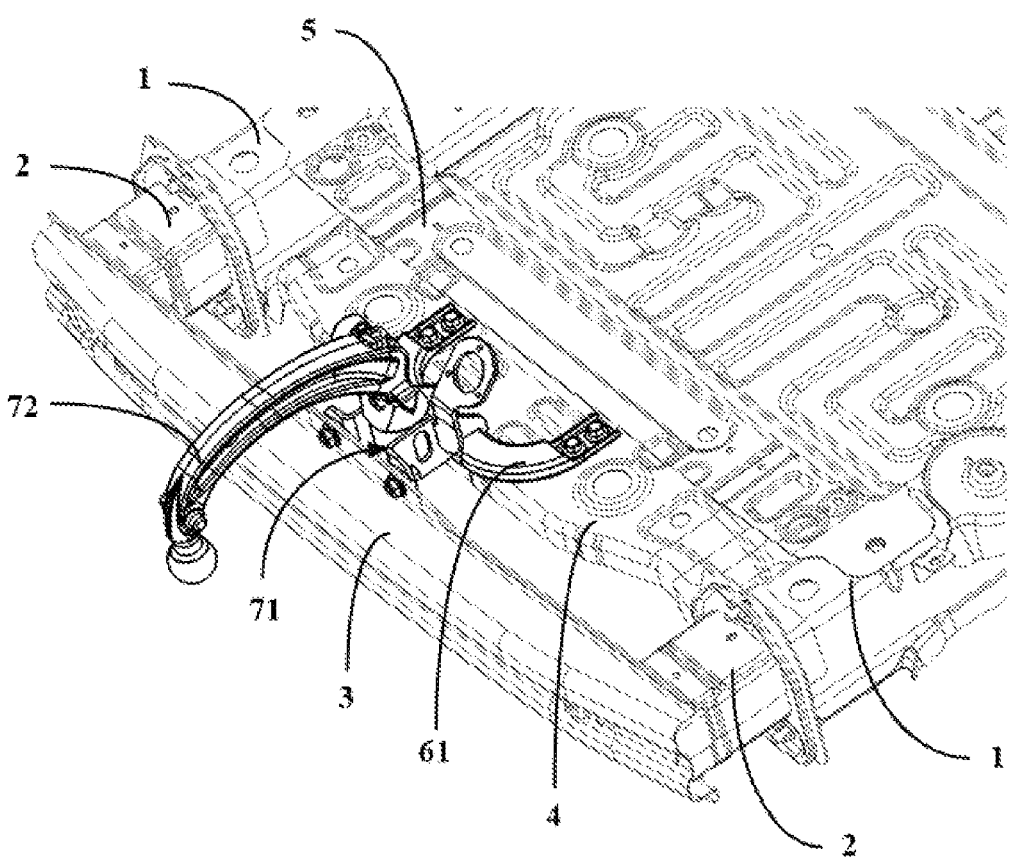
FIG. 2 shows a back schematic structural diagram of a towing device for a vehicle according to an embodiment of the present disclosure.
Figure 3:
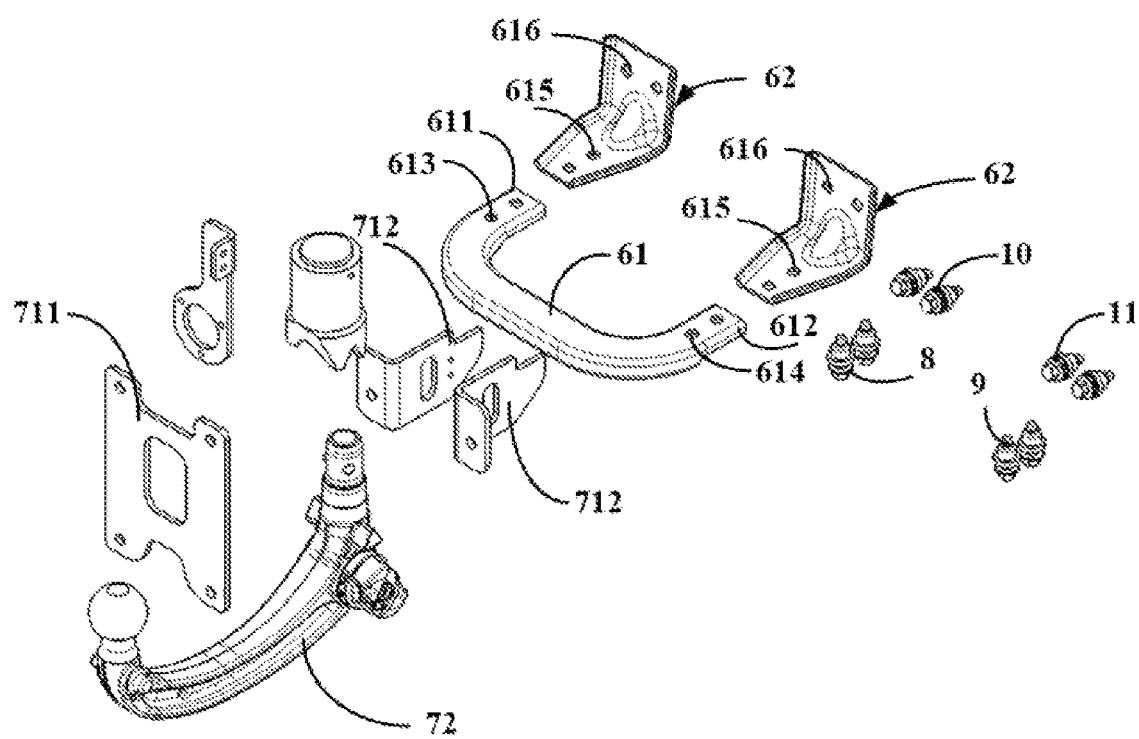
FIG. 3 shows a schematic exploded view of a towing device for a vehicle according to an embodiment of the present disclosure.

FIG. 1 shows a front schematic structural diagram of a towing device for a vehicle according to an embodiment of the present disclosure. FIG. 2 shows a back schematic structural diagram of a towing device for a vehicle according to an embodiment of the present disclosure. FIG. 3 shows a schematic exploded view of a towing device for a vehicle according to an embodiment of the present disclosure. "Front surface" involved below means one surface of a vehicle that may be viewed by human eyes when the vehicle is normally placed on the ground. "Back surface" is the other surface opposite the "front surface".

Embodiment 1

As shown in FIGS. 1-3, the vehicle includes two longitudinal members 1, two energy absorption boxes 2 arranged at ends of the two longitudinal members 1 respectively, a rear anti-collision beam 3 connected to the longitudinal members 1 by means of the energy absorption boxes 2 and transversely arranged, and a rear floor 4 and a rear floor cross member 5 which are located between the two longitudinal members 1. The towing device includes a front end portion 6 and a rear end portion 7 connected to the front end portion 6. The front end portion 6 is arranged on the rear floor 4 and the rear floor cross member 5 of the vehicle. The rear end portion 7 includes a connecting seat 71 and a tow hook 72 connected to the connecting seat 71 together, where the connecting seat 71 is arranged on the rear anti-collision beam 3, and the tow hook 72 extends out of the vehicle from a portion connected to the connecting seat 71. An external force borne by the front end portion 6 is dispersed to the rear floor cross member 5, and an external force borne by the rear end portion 7 is transmitted to the longitudinal members 1 by means of the rear anti-collision beam 3 and the energy absorption boxes 2.

According to the solution of the embodiment of the present disclosure, a structure of the towing device is designed, the front end portion 6 of the towing device is arranged on the rear floor 4 and the rear floor cross member 5 of the vehicle, and the connecting seat 71 of the rear end portion 7 is arranged on the rear anti-collision beam 3, such that the original rear anti-collision beam 3 and the original energy absorption boxes 2 of the vehicle are reserved, and during low-speed collision, the rear anti-collision beam 3 and the energy absorption boxes 2 may still absorb collision energy by way of deformation. In addition, since the towing device is only provided with the front end portion 6 and the rear end portion 7, compared with the solution that a towing device is provided with a cross member in the prior art, an overall weight thereof is greatly reduced, such that mounting operation by one person may be achieved.

Embodiment 2

In this embodiment, as shown in FIGS. 2 and 3, the front end portion 6 includes a U-shaped beam 61 and two L-shaped supports 62. The U-shaped beam 61 is arranged on a back surface of the rear floor 4. The two L-shaped supports 62 are both arranged on a front surface of the rear floor 4. The U-shaped beam 61 is provided with a first end 611 and a second end 612 that are oppositely arranged. One end of one L-shaped support 62 is connected to the first end 611 of the U-shaped beam 61, and the other end of the one L-shaped support is connected to the rear floor cross member 5. One end of the other L-shaped support 62 is connected to the second end 612 of the U-shaped beam 61, and the other end of the other L-shaped support is connected to the rear floor cross member 5.

The connecting seat 71 of the rear end portion 7 is arranged on a back surface of the rear anti-collision beam 3, and the connecting seat 71 is detachably connected to the U-shaped beam 61 together. The connecting seat 71 includes a connecting plate 711 and fixing frames 712 connected to the connecting plate 711 by means of a fastener. The connecting plate 711 is configured as a flat plate structure, and is mounted on the back surface of the rear anti-collision beam 3. The fixing frames 712 are L-shaped on the whole, there are two fixing frames, and the two fixing frames 712 are connected to two sides of the flat plate structure respectively and located on two sides of the tow hook 72. The two fixing frames 712 are both connected to the U-shaped beam 61.

The first end 611 of the U-shaped beam 61 is provided with two first mounting holes 613, and the second end 612 of the U-shaped beam 61 is provided with two second mounting holes 614. The two first mounting holes 613 are arranged in a length direction of a vehicle body at the first end 611 of the U-shaped beam 61, and the two second mounting holes 614 are arranged in the length direction of the vehicle body at the second end 612 of the U-shaped beam 61. One end of each of the L-shaped supports 62 is provided with two third mounting holes 615. The other end of each of the L-shaped supports 62 is provided with two fourth mounting holes 616.

The two third mounting holes 615 of one L-shaped support 62 are arranged in the length direction of the vehicle body and correspond to the two first mounting holes 613, so as to make one first bolt 8 of two first bolts 8 penetrate one first mounting hole 613 and the third mounting hole 615 corresponding to the one first mounting hole 613, and make the other one first bolt 8 of the two first bolts 8 penetrate the other first mounting hole 613 and the other third mounting hole 615 corresponding to the other first mounting hole 613, such that the first end 611 of the U-shaped beam 61 is connected to the one L-shaped support 62 together.

The two third mounting holes 615 of the other L-shaped support 62 are arranged in the length direction of the vehicle body and correspond to the two second mounting holes 614, so as to make one second bolt 9 of two second bolts 9 penetrate one second mounting hole 614 and the third mounting hole 615 corresponding to the one second mounting hole 614, and make the other one first bolt 8 of the two first bolts 8 penetrate the other second mounting hole 614 and the other third mounting hole 615 corresponding to the other second mounting hole 614, such that the second end 612 of the U-shaped beam 61 is connected to the other L-shaped support 62 together.

The two fourth mounting holes 616 of one L-shaped support 62 are arranged in a width direction of the vehicle body, one third bolt 10 of two third bolts 10 penetrate one fourth mounting hole 616 of the two fourth mounting holes 616 and the rear floor cross member 5, and the other third bolt 10 penetrates the other fourth mounting hole 616 of the one L-shaped support 62 and the rear floor cross member 5, thereby connecting the one L-shaped support 62 to the rear floor cross member 5 together.

The two fourth mounting holes 616 of the other L-shaped support 62 are arranged in the width direction of the vehicle body, one fourth bolt 11 of two fourth bolts 11 penetrates one fourth mounting hole 616 of the two fourth mounting holes 616 and the rear floor cross member 5, and the other fourth bolt 11 penetrates the other fourth mounting hole 616 of the other L-shaped support 62 and the rear floor cross member 5, thereby connecting the other L-shaped support 62 to the rear floor cross member 5 together.

The rear floor cross member 5 is internally provided with a cross member reinforcing plate (not shown in the figures), and the L-shaped supports 62 penetrate the cross member reinforcing plate when being connected to the rear floor cross member 5.

According to the embodiment of the present disclosure, the U-shaped beam 61 and one end of each of the L-shaped supports 62 are connected to the rear floor 4, the other end of each of the L-shaped supports 62 together with the cross member reinforcing plate is connected to the rear floor cross member 5, and during towing, stress of the tow hook 72 uniformly disperses a tensile force to the rear floor cross member 5 by means of the U-shaped beam 61, to achieve the purpose of bearing the tensile force in the length direction of the vehicle body. Moreover, the U-shaped beam 61 is arranged to be U-shaped, such that connecting points on the rear floor cross member 5 are separated by a certain distance in the width direction of the vehicle body, torsion resistance of the towing device is enhanced, and capacity of bearing torque in the width direction of the vehicle body may be achieved when the vehicle turns and a road surface is bumpy and fluctuates. The L-shaped supports 62 have the effects of a reinforcing rib and a flanging and bear bending moment generated due to road bumping during towing together with the cross member reinforcing plate.

In addition, at a rear end of the towing device, the connecting seat 71 is connected to the rear anti-collision beam 3, and a tensile force and a vertical force borne by the rear end are transmitted to the longitudinal members 1 by means of the rear anti-collision beam 3 and the energy absorption boxes 2, to satisfy a vertical carrying requirement. The first mounting holes 613, the second mounting holes 614, the third mounting holes 615 and the fourth mounting holes 616 are provided in the mode of the embodiment of the present disclosure, such that the functions of the U-shaped beam 61 and the L-shaped supports 62 may be further enhanced.

Embodiment 3

The embodiment 3 differs from the embodiment 2 in that there are one, three or more first mounting holes 613, one, three or more second mounting holes 614, one, three or more third mounting holes 615, and one, three or more fourth mounting holes 616; there are one, three or more first bolts 8, one, three or more second bolts 9, one, three or more third bolts 10, and one, three or more fourth bolts 11; and the numbers thereof may be configured as required.

Particularly, the present disclosure further provides a vehicle. The vehicle includes the towing device in the above embodiments.

Compared with a traditional towing device, the towing device of the present disclosure reduces weight of the body, improves mounting convenience, shortens mounting time, and meanwhile, reserves low-speed collision performance of the whole vehicle on the premise of satisfying towing capacity.

So far, those skilled in the art should recognize that although a plurality of exemplary embodiments of the present disclosure have been shown and described in details herein, many other variations or modifications conforming to the principles of the present disclosure may be directly determined or derived from the contents disclosed in the present disclosure without departing from the spirit and scope of the present disclosure. Therefore, the scope of the present disclosure should be understood and deemed to cover all these other variations or modifications.

What is claimed is:

1. A towing device for a vehicle, the vehicle comprising two longitudinal members longitudinally extending along the vehicle, a rear anti-collision beam arranged on one side of the two longitudinal members and transversely extending along the vehicle, and a rear floor and a rear floor cross member that are arranged between the two longitudinal members, an end of each of the longitudinal members close to the rear anti-collision beam being connected to the rear anti-collision beam by means of an energy absorption box, wherein the towing device comprises a front end portion and a rear end portion connected to the front end portion, the front end portion is arranged on the rear floor and the rear floor cross member, so as to disperse an external force borne by the front end portion to the rear floor cross member, the rear end portion comprises a connecting seat and a tow hook connected to the connecting seat and extending out towards an exterior of the vehicle, the connecting seat being arranged on the rear anti-collision beam, so as to transmit an external force borne by the rear end portion to the longitudinal members by means of the rear anti-collision beam and the energy absorption boxes;

the front end portion comprises a U-shaped beam, the U-shaped beam being arranged on a back surface of the rear floor;

the U-shaped beam is provided with a first end and a second end that are oppositely arranged, and the front end portion further comprises two L-shaped supports, the two L-shaped supports being both arranged on a front surface of the rear floor;

one end of one L-shaped support being connected to the first end of the U-shaped beam, and the other end of the one L-shaped support being connected to the rear floor cross member; and one end of the other L-shaped support being connected to the second end of the U-shaped beam, and the other end of the other L-shaped support being connected to the rear floor cross member.

2. The towing device according to claim 1, wherein the first end of the U-shaped beam is provided with at least one first mounting hole, the second end of the U-shaped beam is provided with at least one second mounting hole, and one end of each of the L-shaped supports is provided with at least one third mounting hole; and the towing device further comprises at least one first bolt and at least one second bolt, the first bolt penetrating the first mounting hole of the first end and the third mounting hole of one L-shaped support, to connect the U-shaped beam and the one L-shaped support together, and the second bolt penetrating the second mounting hole of the second end and the third mounting hole of the other L-shaped support, to connect the U-shaped beam and the other L-shaped support together.

3. The towing device according to claim 2, wherein the other end of each of the L-shaped supports is provided with at least one fourth mounting hole, and the towing device further comprises at least one third bolt and at least one fourth bolt, the third bolt penetrating the fourth mounting hole of one L-shaped support and the rear floor cross member, to connect the one L-shaped support and the rear floor cross member together, and the fourth bolt penetrating the fourth mounting hole of the other L-shaped support and the rear floor cross member, to connect the other L-shaped support and the rear floor cross member together.

4. The towing device according to claim 3, wherein the rear floor cross member is internally provided with a cross member reinforcing plate, and the L-shaped supports penetrate the cross member reinforcing plate when being connected to the rear floor cross member.

5. The towing device according to claim 1, wherein the connecting seat is arranged on a back surface of the rear anti-collision beam.

6. The towing device according to claim 1, wherein the connecting seat is detachably connected to the U-shaped beam.

7. A vehicle, comprising the towing device of claim 1.

* * * * *